United States Patent [19]

Kondo et al.

[11] Patent Number: 4,792,581

[45] Date of Patent: Dec. 20, 1988

[54] RUBBER COMPOSITION

[75] Inventors: Takeo Kondo, Tokyo; Yuichiro Kushida, Gunma; Yasushi Abe, Tokyo, all of Japan

[73] Assignee: Denki Kagaku Kogyo Kabushiki Kaisha, Tokyo, Japan

[21] Appl. No.: 947,330

[22] Filed: Dec. 29, 1986

[30] Foreign Application Priority Data

Dec. 28, 1985 [JP] Japan ................. 60-293532

[51] Int. Cl.$^4$ ............... C08L 23/26; C08L 33/04; C08L 23/06; C08K 3/04
[52] U.S. Cl. ................... 524/523; 525/194; 525/223; 525/227
[58] Field of Search ............ 525/223, 194, 227; 524/523

[56] References Cited

U.S. PATENT DOCUMENTS

| | | | |
|---|---|---|---|
| 3,806,558 | 4/1974 | Fischer | 525/240 |
| 3,941,859 | 3/1976 | Batiuk et al. | |
| 3,951,871 | 4/1976 | Lloyd et al. | |
| 4,210,579 | 7/1980 | Grigo et al. | |
| 4,303,560 | 12/1981 | Takahashi | |
| 4,409,365 | 10/1983 | Coran et al. | 525/194 |
| 4,508,885 | 4/1985 | Nishiwaki et al. | |
| 4,517,348 | 5/1985 | Takahashi et al. | |
| 4,555,546 | 11/1985 | Patel | 525/194 |
| 4,696,987 | 9/1987 | Shedd et al. | 525/194 |

FOREIGN PATENT DOCUMENTS

| | | |
|---|---|---|
| 0004313 | 10/1979 | European Pat. Off. |
| 0092318 | 10/1983 | European Pat. Off. |
| 0158422 | 10/1985 | European Pat. Off. |
| 2271640 | 5/1975 | France |
| 12525 | 2/1982 | Japan |
| 125252 | 8/1982 | Japan |
| 14745 | 1/1983 | Japan |
| 147451 | 9/1983 | Japan |
| 95056 | 1/1986 | Japan |
| 9505686 | 5/1986 | Japan |

OTHER PUBLICATIONS

H. Iino et al., Nippon Gomu Kyokaishi, vol. 38, 496, 7 (1964).

M. Imoto et al., Nippon Gomu Kyokaishi, vol. 38, 1007, 1073, 1080 (1965).

K. Horie et al., Nippon Gomu Kyokaishi, vol. 42, 24, 10, 17 (1968).

*Primary Examiner*—Carman J. Seccuro
*Attorney, Agent, or Firm*—Sughrue, Mion, Zinn, Macpeak & Seas

[57] ABSTRACT

A rubber composition comprising a crosslinked blend containing a mixture of from 50 to 95% by weight of an acrylic elastomer and from 5 to 50% by weight of polyethylene is disclosed. The composition has improved resistance to fuel oil, particularly alcohol-added gasoline, as well as cold temperature resistance and heat resistance, and is, therefore, useful as a fuel oil resistant material.

29 Claims, No Drawings

RUBBER COMPOSITION

FIELD OF THE INVENTION

This invention relates to a rubber composition having excellent durability. More particularly, it relates to a rubber composition comprising a crosslinked blend of an acrylic elastomer and polyethylene, which is particularly suitable for hoses or diaphragms.

BACKGROUND OF THE INVENTION

Rubber parts contacting with fuel oil have been made of selected rubber materials whose durability is not impaired by contact with fuel oil. For example, fuel oil hoses have conventionally been produced from oil-resistant rubbers, such as a nitrile rubber (NBR) and a hydrin rubber, e.g., an epichlorohydrin polymer (CO) and an ethylene oxide-epichlorohydrin copolymer (ECO). However, alcohol-added gasoline (hereinafter referred to as "gasohol") has recently appeared on the market due to a combination of circumstances, and deterioration of rubber parts due to contact with gasohol, in particular the volume change on immersion in gasohol, becomes a serious problem. Therefore, NBR, CO, ECO, etc., do not always exhibit sufficient resistance to gasoline for use as a fuel oil hose material, and it has been keenly demanded to develop a rubber material having further improved durability.

SUMMARY OF THE INVENTION

One object of this invention is to provide an inexpensive rubber composition having improved durability, particularly to gasohol, as required for use as fuel oil hoses for automobiles, and the like.

It has been found that this object can be met by the present invention, directed to a rubber composition comprising a crosslinked blend containing a mixture of from 50 to 95% by weight of an acrylic elastomer and from 5 to 50% by weight of polyethylene. The rubber composition according to the present invention exhibits high durability, particularly against gasohol, and is, therefore, suitable for various applications under severe conditions.

DETAILED DESCRIPTION OF THE INVENTION

The acrylic elastomer which can be used in the rubber composition of the invention includes a polymer of an acrylic ester, a copolymer of an acrylic ester and an α-olefin, acrylonitrile, a carboxylic acid vinyl ester, an aromatic vinyl compound, etc., and a modified product thereof. Examples of the acrylic ester include alkyl acrylates and alkoxyalkyl acrylates.

The alkyl acrylates to be used are compounds represented by formula (I)

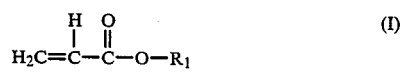

wherein $R_1$ represents an alkyl group having from 1 to 8 carbon atoms.

Specific examples of the alkyl acrylate of formula (I) are methyl acrylate, ethyl acrylate, propyl acrylate, n-butyl acrylate, isobutyl acrylate, pentyl acrylate, isoamyl acrylate, n-hexyl acrylate, n-octyl acrylate, and 2-ethylhexyl acrylate. Of these, preferred are methyl acrylate and ethyl acrylate.

The alkoxyalkyl acrylates to be used are compounds represented by formula (II)

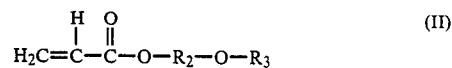

wherein $R_2$ represents an alkylene group having from 1 to 4 carbon atoms; and $R_3$ represents an alkyl group having from 1 to 4 carbon atoms.

Specific examples of the alkoxyalkyl acrylate of formula (II) are 2-methoxyethyl acrylate, 2-ethoxyethyl acrylate, 2-(n-propoxy)ethyl acrylate, 2-(n-butoxy)ethyl acrylate, 2-(iso-butoxy)ethyl acrylate, 3-methoxypropyl acrylate, 3-ethoxypropyl acrylate, 3-(n-propoxy)propyl acrylate, 3-(n-butoxy)propyl acrylate, etc. Preferred of these are 2-methoxyethyl acrylate, 2-ethoxyethyl acrylate, and 2-butoxyethyl acrylate, with 2-methoxyethyl acrylate being more preferred.

The α-olefins to be used as comonomers include ethylene, propylene, n-butene-1, isobutene, vinyl chloride, vinylidene chloride, etc., with ethylene being particularly preferred.

Examples of the carboxylic acid vinyl esters to be used as comonomers include vinyl acetate, vinyl propionate, vinyl butyrate, etc. Preferred among them are vinyl acetate and vinyl propionate, and more preferred is vinyl acetate.

The aromatic vinyl compounds include styrene, α-methylstyrene, chlorostyrene, vinyltoluene, etc.

The acrylic elastomer to be used in the invention preferably has a acrylic ester content of from 60 to 100% by weight, and more preferably an alkoxyalkyl acrylate content of from 60 to 100% by weight. When the acrylic ester content is less than 60% by weight, the resistance to gasohol is reduced.

In addition to the acrylic ester monomer unit, the acrylic elastomer may further have up to 40% by weight of the comonomers as above-recited. Of the comonomers, the content of the α-olefin, particularly ethylene, is preferably not more than 15% by weight. If the α-olefin content is more than 15% by weight, the resulting rubber compositions shows reduction of resistance to gasohol. If the total content of the comonomer units, such as α-olefins, carboxylic acid vinyl esters, acrylonitrile, etc., exceeds 40% by weight, the composition tends to lose its elastic properties.

Acrylic elastomers which can be used preferably in the present invention include those having from 60 to 90% by weight of an alkoxyalkyl acrylate unit, not more than 15% by weight of ethylene unit, not more than 40% by weight of a carboxylic acid vinyl ester unit, and not more than 40% by weight of acrylonitrile unit; those having from 60 to 90% by weight of an alkoxyalkyl acrylate unit, not more than 15% by weight of an ethylene unit, and not more than 40% by weight of a carboxylic acid vinyl ester unit; and those having not less than 60% by weight of an alkoxyalkyl acrylate unit and not more than 40% by weight of an acrylonitrile unit; and those having 100% by weight of an alkoxyalkyl acrylate unit. More preferred acrylic elastomers are those having from 75 to 89% by weight of an alkoxyalkyl acrylate unit, from 1 to 5% by weight of an ethylene unit, and not more than 20% by weight of a carboxylic acid vinyl ester unit; those having from 90 to 97% by weight of an alkoxyalkyl acrylate unit and from 3 to 10% by weight of an acrylonitrile unit; and those having from 90 to 95% by weight of an alkoxyalkyl acrylate unit and from 5 to 10% by weight of a carboxylic acid vinyl ester unit.

The acrylic elastomer to be used can be synthesized easily by radical polymerization of the above-described monomers. The polymerization can be carried out by any techniques, such as emulsion polymerization, suspension polymerization, solution polymerization, bulk polymerization, and the like. A free radical generator, such as persulfates, peroxides, azo compounds, oxidation-reduction catalysts, etc., is usually employed as a polymerization initiator. The polymerization is generally carried out at a temperature between 0° C. and 100° C., and preferably between 5° C. and 65° C.

The produced elastomer is recovered and dried by a method suited for the particular polymerization techniques adopted.

It is also possible that an additional crosslinkable component is copolymerized with the above-described monomers in an amount up to 5% by weight based on the total weight of the above-described monomers. In this case, the resulting elastomer is crosslinkable with compounds having reactivity to such a crosslinkable component. Examples of the crosslinkable component include glycidyl methacrylate, allyl glycidyl ether, acrylic acid, 2-chloroethyl vinyl ether, etc.

The polyethylene which can be used in the rubber composition of this invention is not particularly restricted, but usually, polyethylene having a specific gravity (d) of 0.89 or more is used. In particular, medium-density (d: 0.926–0.940) polyethylene, low-density (d: 0.910–0.925) polyethylene, or linear low-density polyethylene is preferred. Crosslinked polyethylene may also be employed. However, in view of the object of this invention, it is unfavorable to use modified polyethylene having its crystallinity so decreased as to be soluble in gasoline at 40° C. (determined by testing for solubility in toluene at 40° C.).

The crosslinking blend in accordance with the present invention essentially comprises a mixture of at least 50% by weight of the aforesaid acrylic elastomer and at least 5% by weight of polyethylene. If the acrylic elastomer content is less than 50% by weight, rubber elasticity sufficient for practical use cannot be attained. If the polyethylene content is less than 5% by weight, the resulting rubber composition has poor resistance to gasohol.

The mixture of the acrylic elastomer and polyethylene is crosslinked with various known crosslinking agents, and peroxides are most effectively used as a crosslinking agent for ensuring well-balanced physical properties of the resulting crosslinked product, such as compressive set, and the like. The peroxides which can be used are not particularly restricted and include those commonly employed for crosslinking of rubber. Specific examples of usable peroxides are di-t-butyl peroxide, t-butylcumyl peroxide, dicumyl peroxide, $\alpha,\alpha$-bis(t-butyl peroxyisopropyl)benzene, 2,5-dimethyl-2,5-di(t-butylperoxy)hexane, 2,5-dimethyl-2,5-di(t-butylperoxy)hexyne-3, 1,1-bis(t-butylperoxy)-3,3,5-trimethylcyclohexane, n-butyl-4,4-bis(t-butylperoxy)valerate, 2,2-bis(t-butylperoxy)butane, 2,2-bis(t-butylperoxy)octane, etc.

The amount of the peroxide as a crosslinking agent is not so critical and usually ranges from about 1 to about 10 parts by weight per 100 parts by weight of the mixture of acrylic elastomer and polyethylene.

When the mixture is crosslinked with a peroxide crosslinking agent, it is more effective to use a polyfunctional monomer in combination. A suitable amount of the polyfunctional monomer is up to 15 parts by weight per 100 parts by weight of the mixture. Excessive amounts of the polyfunctional monomer unfavorably reduce flexibility of the resulting crosslinked product. Specific examples of the polyfunctional monomer include trimethylolpropane trimethacrylate, trimethylolpropane triacrylate, triallyl isocyanurate, triallyl cyanurate, triallyl trimellitate, 1,6-hexanediol acrylate, triethylene glycol diacrylate, polyethylene glycol diacrylate, diallyl phthalate, 1,2-polybutadiene, etc., with trimethylolpropane trimethacrylate and trimethylolpropane triacrylate being preferred. In particular, trimethylolpropane trimethacrylate is more preferred.

In order to balance physical properties of the resulting crosslinked product, it is also effective to use a radical scavenger or a thiourea derivative in the crosslinking with a peroxide. The amount of the radical scavenger or the thiourea derivative to be used preferably ranges from 0.1 to 3 parts by weight or from 0.1 to 5 parts by weight, respectively, per 100 parts by weight of the mixture of acrylic elastomer and polyethylene. A large amount of the radical scavenger exceeding 3 parts by weight consumes the peroxide, deviating from the purpose of balancing the physical properties of the crosslinked product. Similarly, a large amount of the thiourea derivative exceeding 5 parts by weight adversely affects the physical properties of the resulting crosslinked product.

The radical scavenger to be used in combination includes compounds generally employed as polymerization inhibitors or antioxidants, sulfur, and sulfur-containing compounds. Typical examples of such compounds include phenothiazine, 2,6-di-t-butyl-p-cresol, etc., with phenothiazine being particularly preferred.

In cases where a crosslinkable component, such as glycidyl methacrylate, acrylic acid, 2-chloroethyl vinyl ether, etc., is added to the acrylic elastomer to thereby impart special crosslinkability to the mixture as described above, such a mixture can be crosslinked with a crosslinking agent other than the above-described crosslinking agents such as peroxides. For example, when the acrylic elastomer contains a glycidyl group attributed to the aforesaid crosslinking component, the mixture of such acrylic elastomer and polyethylene may be crosslinked with amine compounds such as polyamines and amine derivatives. In this case, the amine compounds are suitably used in an amount not more than 5 parts by weight, and preferably of from 0.3 to 3 parts by weight, per 100 parts by weight of the mixture. Amounts exceeding 5 parts by weight result in excessively high crosslink density, sometimes failing to obtain sufficient mechanical strength.

If desired, various additives commonly employed in the rubber industry can be further added in the mixture of acrylic elastomer and polyethylene so as to meet various requirements for particular use, such as fillers, plasticizers, processing aids, stabilizers, and the like. In particular, addition of fillers in an amount of from 5 to 300 parts by weight per 100 parts by weight of the mixture improves the state of blend and processability of the resulting rubber composition. The plasticizers to be added include those having an affinity for the rubber composition of the present invention, such as $\alpha$-olefin oligomers, polybutene, butyl rubber, ethylene-propylene rubber, polyether, polyester, etc. Addition of butyl rubber or polybutene having a molecular weight of less than 100,000 in an amount less than twice the weight of polyethylene is particularly effective to improve flexibility of the rubber composition.

If desired, the blend of the present invention may be used in combination with other various polymeric substances, for example, rubbers or polymers having excellent resistance to fuel oil, such as NBR, hydrogenated NBR, CO, ECO, fluorine rubber, chlorosulfonated polyethylene, chlorinated polyethylene, polyvinylidene fluoride, silicone rubber, polyvinyl chloride and a copolymer thereof, polyvinyl acetate and a copolymer thereof, etc. These polymeric substances may be added in an amount of not more than 30 parts by weight per 100 parts by weight of the mixture of acrylic elastomer and polyethylene.

The blend containing the acrylic elastomer and polyethylene of the present invention can be prepared by kneading the above-described components using, for example, an open roll mill, an internal mixer, etc. according to conventional methods in the rubber industry, such as (1) a method of kneading the acrylic elastomer, polyethylene, and other components at a temperature above the melting point of the polyethylene; (2) a method comprising blending the acrylic elastomer and polyethylene at a temperature below the melting point of the polyethylene, adding various additives, compounding components, and a crosslinking agent to the blend, and kneading the blend at a temperature above the melting point of polyethylene; and (3) a method of kneading the components other than a crosslinking agent at a temperature above the melting point of the polyethylene and kneading the resulting blend with a crosslinking agent at a temperature below the melting point of the polyethylene. The last method is effective to prevent scorching. Thus, the preparation of the blend according to the present invention does not require any special blending operation, which is one of the advantages of this invention.

The thus prepared blend is then vulcanized by crosslinking in a conventional manner commonly employed in the rubber industry. Conditions for crosslinking vary depending on the kind and amount of the crosslinking agent used, but crosslinking is usually carried out by heating the blend at a temperature of from 120° to 200° C. for a period of from about 2 to 200 minutes. If desired, a primary vulcanized product is subjected to heat treatment in an air-oven to effect post-curing to obtain a stable vulcanized rubber.

The rubber composition according to the present invention is excellent particularly in resistance to gasohol, as well as cold temperature resistance and heat resistance, and exhibits, therefore, very high durability as a fuel oil-resistant material for various parts contacting fuel oil, such as fuel oil hoses, air hoses, various controlling hoses, diaphragms, and so on.

This invention will now be illustrated in greater detail with reference to the following example, but it should be understood that the present invention is not limited thereto. In these examples, all the percents and parts are by weight unless otherwise indicated.

PREPARATION EXAMPLE

Acrylic Elastomers A to D were prepared as follows. In a 130 liter-volume autoclave were charged 43 kg of water, 40 kg of a liquid monomer mixture having the composition as shown in Table 1, 1,400 g of polyvinyl alcohol, and 60 g of sodium acetate, followed by mixing with stirring. The inner temperature of the autoclave was kept at 45° C., and the atmosphere of the autoclave was replaced by nitrogen.

In the case when an oxidation-reduction initiator was used, 2 g of ferric sulfate, 4 g of ethylenediaminetetraacetic acid, and 90 g of sodium formaldehydesulfoxylate (promoter) were additionally charged in the autoclave, and the mixture was thoroughly mixed. An aqueous solution of ammonium persulfate (polymerization initiator) was separately introduced to the mixture to effect polymerization. The polymerization reaction was completed in 12 hours.

In the case of using a radical generator alone, an aqueous solution containing 20 g of the radical generator was added to the mixture to effect polymerization. In this case, the polymerization reaction was complete in 10 hours.

To the resulting polymerization mixture was added an aqueous solution of sodium sulfate to coagulate the polymer. The coagulated polymer was washed with water and dried to obtain the desired acrylic elastomer.

In the case when a gaseous monomer was used, such a monomer was introduced to the upper part of the autoclave under a prescribed pressure, and the liquid phase in the autoclave was thoroughly agitated until absorption of the gaseous monomer into the liquid monomer(s) reaches equilibrium. A polymerization initiator was then introduced thereto to effect polymerization in the same manner as described above. The resulting reaction mixture was worked-up in the same manner as described above to obtain the desired acrylic elastomer.

Each of the thus obtained Acrylic Elastomers A to D was quantitatively analyzed by $^{13}$C-NMR. In the case of Acrylic Elastomers C and D in which small amounts of glycidyl methacrylate and allyl glycidyl ether were additionally used as crosslinking components, since these components cannot be determined precisely by $^{13}$C-NMR, the glycidyl content in the resulting elastomer was separately determined by titration. The results of these determinations are shown in Table 1.

TABLE 1

| | Acrylic Elastomer | | | |
|---|---|---|---|---|
| | A | B | C | D |
| Composition of Monomer Mixture Charged (part): | | | | |
| Ethylene | — | — | 5.5 | — |
| Vinyl Acetate | 10 | — | 37.2 | — |
| Methoxyethyl acrylate | 90 | 90 | 55.8 | 98.5 |
| Acrylonitrile | — | 10 | — | — |
| Glycidyl methacrylate | — | — | 0.4 | 0.5 |
| Allyl glycidyl ether | — | — | 1.1 | 1.0 |
| Composition of Elastomer Produced (%): | | | | |
| Ethylene | — | — | 3 | — |
| Vinyl acetate | 5 | — | 17 | — |
| Methoxyethyl acrylate | 95 | 94 | 80 | 100 |
| Acrylonitrile | — | 6 | — | — |
| Content of glycidyl group (milli-equivalent/kg) | — | — | 62 | 70 |

EXAMPLES 1 TO 5 AND COMPARATIVE EXAMPLES 1 TO 3

Acrylic Elastomer A as prepared in Preparation Example and linear low-density polyethylene ("Ultzex 3021F", produced by Mitsui Petrochemical Ind., Ltd., specific gravity=0.92) were blended at a varying mixing ratio as shown in Table 2 together with the following compounding components. The amounts (part by weight) of these components are given per 100 parts by weight of the total amount of acrylic elastomer and polyethylene.

| Compounding Component | Amount (part) |
|---|---|
| Stearic acid | 1 |
| Liquid paraffin | 1 |
| HAF Carbon Black (produced by Tokai Carbon K.K.) | 60 |
| RS-700 (ester type plasticizer produced by Adeka Argus Chemical Co., Ltd.) | 10 |
| Trimethylolpropane trimethacrylate | 2 |
| Trimethylthiourea | 0.5 |
| Phenothiazine | 0.5 |
| Perhexa V-40 (40% 2,5-dimethyl-2,5-di-(t-butylperoxy)hexane, produced by Nippon Oils & Fats Co., Ltd.) | 8 |

The blending was carried out by the use of an 8-inch roll rubber mill at a roll temperature of 120° C. The resulting blend was formed into sheets and then subjected to press vulcanization at 170° C. for 20 minutes. Physical properties of each of the resulting rubber compositions were evaluated in accordance with JIS K6301. The results obtained are shown in Table 2.

TABLE 2

|  | Example No. |  |  |  |  | Comparative Example No. |  |  |
|---|---|---|---|---|---|---|---|---|
|  | 1 | 2 | 3 | 4 | 5 | 1 | 2 | 3 |
| Mixing Ratio of Acrylic Elastomer/Polyethylene (part) | 95/5 | 90/10 | 80/20 | 60/40 | 50/50 | 100/0 | 0/100 | 40/60 |
| Resistance to Gasohol[1] (%) | 75 | 69 | 53 | 38 | 31 | 88 | 14 | 26 |
| Resistance to Fuel Oil[2] (%) | −4 | 15 | 35 | 76 | 95 | −12 | 172 | 111 |
| Elongation Set[3] (%) | 8 | 9 | 11 | 12 | 15 | 8 | 21 | 19 |
| Tensile Strength (kgf/cm$^2$) | 83 | 84 | 96 | 133 | 151 | 68 | 252 | 172 |
| Hardness[4] | 70 | 75 | 82 | 89 | 90 | 60 | 93 | 92 |
| Elongation at Break (%) | 170 | 150 | 120 | 160 | 180 | 150 | 280 | 190 |
| Low Temperature Property (Bend Test at −40° C.) | pass | pass | pass | pass | pass | failed | pass | pass |

Note:
[1]Volume change (ΔV) after immersion in a mixture of Fuel C (toluene/isooctane = 50/50 by vol.)/C$_2$H$_5$OH (80/20 by vol.) at 40° C. for 70 hours.
[2]Volume change (ΔV) after immersion in JIS No. 3 Oil at 150° C. for 70 hours.
[3]Deformation measured 10 minutes after the test sheet was subjected to 50% elongation for 10 minutes.
[4]JIS-A type It can be seen from Table 2 that gasohol resistance of the rubber composition is markedly improved as the proportion of polyethylene increases, whereas the compositions containing more than 50 parts by weight of polyethylene per 100 parts of the mixture of acrylic elastomer and polyethylene have high elongation sets indicative of low rubber elasticity and are, therefore, unsuitable as a rubber composition.

EXAMPLES 6 TO 11

Acrylic Elastomer B, C, or D as prepared in Preparation Example or a commercially available acrylic rubber ("Nipol AR-31 or 32", produced by Nippon Zeon Co., Ltd.) and polyethylene ("Ultzex L2021LP", produced by Mitsui Petrochemical Ind., Ltd., specific gravity=0.92; or "VLDPE CN1001", produced by Sumitomo Chemical Co., Ltd. specific gravity=0.90) were blended according to the formulation shown in Table 3 by means of an 8-inch rubber roll mill at a roll temperature of 120° C. After carbon black ("ISAF Carbon" or "HAF Carbon") was added to the blend, other compounding additives were added thereto according to the formulation of Table 3, and the blend was kneaded at a temperature of from 80° to 100° C. The resulting blend was formed into sheets to a thickness of 2 mm, primarily cured by press vulcanization at 170° C., and then post-cured in a Geer oven at 150° C., each for a period shown in Table 3. The physical properties of each of the resulting rubber compositions are shown in Table 3.

TABLE 3

|  | Example No. |  |  |  |  |  |
|---|---|---|---|---|---|---|
|  | 6 | 7 | 8 | 9 | 10 | 11 |
| Formulation (part): |  |  |  |  |  |  |
| Acrylic Elastomer B | 75 | — | — | — | — | 75 |
| Acrylic Elastomer C | — | 65 | — | — | — | — |
| Acrylic Elastomer D | — | — | 60 | — | — | — |
| Nipol AR-31[5] | — | — | — | 50 | — | — |
| Nipol AR-32[6] | — | — | — | — | 50 | — |
| Ultzex L2021LP | 25 | 35 | 40 | 50 | 50 | — |
| VLDPE CN1001 | — | — | — | — | — | 25 |
| Stearic acid | 1 | 1 | 1 | 1 | 1 | 1 |
| Naugard 445[7] | 1 | — | 1 | 1 | 1 | 1 |
| ISAF Carbon[8] | 65 | — | — | 1 | 1 | 65 |
| HAF Carbon | — | 40 | 45 | 40 | 40 | — |
| RS-700 | 20 | — | — | — | — | 20 |
| RS107[9] | — | — | 10 | — | — | — |
| HV-100[10] | 25 | — | — | — | — | 25 |
| EP-0045[11] | 5 | — | — | — | — | 5 |
| Trimethylolpropane trimethacrylate | 2.5 | — | — | 2 | 2 | 2.5 |
| Trimethylthiourea | 0.6 | — | — | 0.5 | 0.5 | 0.6 |
| Phenothiazine | 0.6 | — | — | 0.5 | 0.5 | 0.6 |
| Perhexa V-40 | 10 | — | — | 7 | 7 | 10 |
| 1-Cyanoethyl-2-methylimidazole | — | 1 | — | — | — | — |
| Diphenyl guanidine | — | 0.7 | — | — | — | — |
| Ammonium benzoate | — | 0.2 | — | — | — | — |
| Vulcar[12] | — | 0.1 | — | — | — | — |
| Hexaphthalic anhydride | — | — | 0.5 | — | — | — |
| 2-Methylimidazole | — | — | 0.2 | — | — | — |
| Time of Vulcanization: |  |  |  |  |  |  |
| Primary curing (min) | 20 | 20 | 20 | 20 | 20 | 20 |
| Post-curing (hr) | 4 | 8 | 8 | — | — | 4 |
| Physical Properties: |  |  |  |  |  |  |
| Tensile Strength (kgf/cm$^2$) | 111 | 151 | 135 | 130 | 142 | 94 |
| Elongation (%) | 350 | 330 | 360 | 350 | 330 | 400 |
| Hardness[13] | 79 | 89 | 86 | 83 | 88 | 68 |
| Gasohol Resistance[14] | 34 | 75 | 55 | 70 | 68 | 51 |
| Fuel Oil Resistance[15] | 15 | 35 | * | * | * | 43 |
| Compression Set (%)[16] | 31 | 53 | * | * | * | 29 |
| Low Temperature Property (Bend Test at −40° C.) | pass | * | * | * | * | pass |
| Heat Resistance[17] Tensile Strength Change (%) | −2 | * | * | * | * | −9 |

TABLE 3-continued

| | Example No. | | | | | |
|---|---|---|---|---|---|---|
| | 6 | 7 | 8 | 9 | 10 | 11 |
| Elongation Change (%) | −37 | * | * | * | * | −35 |
| Hardness Change (%) | +6 | * | * | * | * | +11 |

Note:
*Not measured
[5] Acrylic rubber mainly composed of ethyl acrylate
[6] Acrylic rubber mainly composed of ethyl acrylate, n-butyl acrylate, and methoxyethyl acrylate
[7] Stabilizer produced by Uniroyal Inc.
[8] Seast 6 produced by Tokai Carbon K.K.
[9] Ester type plasticizer produced by Adeka Argus Chemical Co., Ltd.
[10] Polybutene (molecular weight: 900) produced by Nippon Petrochemicals Co., Ltd.
[11] Ethylene-propylene rubber produced by Mitsui Petrochemical Industries, Ltd.
[12] Vulcanizing agent produced by Toyo Chemical Co., Ltd.
[13], [14] The same as in Table 2.
[15] Volume change (ΔV) after immersion in a mixture of toluene and i-octane (50/50 by volume) at 40° C. for 70 hours.
[16] Deformation after 25% compression at 150° C. for 70 hours.
[17] Physical property change after heat aging in a Geer oven at 150° C. for 70 hours.

As described above, the rubber composition in accordance with the present invention is superior in resistance to fuel oil than acrylic elastomers alone. Further, the rubber composition of the invention also exhibits cold resistance and heat resistance, and is, therefore, suitable as a fuel oil-resistant material.

While the invention has been described in detail and with reference to specific embodiments thereof, it will be apparent to one skilled in the art that various changes and modifications can be made therein without departing from the spirit and scope thereof.

What is claimed is:

1. A rubber composition comprising a cross-linked blend containing a mixture of from 50 to 95% by weight of an acrylic elastomer, from 5 to 50% by weight of polyethylene and carbon black in an amount of from about 40 to 300 parts by weight per 100 parts by weight of the total amount of acrylic elastomer and polyethylene.

2. A rubber composition as in claim 1, wherein said acrylic elastomer contains at least 60% by weight of an acrylic ester.

3. A rubber composition as in claim 2, wherein said acrylic ester is an alkoxyalkyl acrylate.

4. A rubber composition as in claim 3, wherein said alkoxyalkyl acrylate is 2-methoxyethyl acrylate.

5. A further composition as in claim 2, wherein said acrylic elastomer is a polymer of an acrylic ester, or a copolymer of an acrylic ester, and at least one comonomer selected from the group consisting of an α-olefin, acrylonitrile, a carboxylic acid vinyl ester, and an aromatic vinyl compound.

6. A rubber composition as in claim 1, wherein said acrylic elastomer contains from 60 to 90% by weight of an alkoxyalkyl acrylate, not more than 15% by weight of ethylene, not more than 40% by weight of a carboxylic acid vinyl ester, and not more than 40% by weight of acrylonitrile.

7. A rubber composition as in claim 1, wherein said acrylic elastomer contains from 60 to 90% by weight of an alkoxyalkyl acrylate, not more than 15% by weight of ethylene, and not more than 40% by weight of a carboxylic acid vinyl ester.

8. A rubber composition as in claim 1, wherein said acrylic elastomer contains not less than 60% by weight of an alkoxyalkyl acrylate, and not more than 40% by weight of acrylonitrile.

9. A rubber composition as in claim 3, wherein said acrylic elastomer contains 100% by weight of an alkoxyalkyl acrylate.

10. A rubber composition as in claim 1, wherein said acrylic elastomer contains from 75 to 89% by weight of an alkoxyalkyl acrylate, from 1 to 5% by weight of ethylene, and not more than 20% by weight of a carboxylic acid vinyl ester.

11. A rubber composition as in claim 1, wherein said acrylic elastomer contains from 90 to 97% by weight of an alkoxyalkyl acrylate, and from 3 to 10% by weight of acrylonitrile.

12. A rubber composition as in claim 1, wherein said acrylic elastomer contains from 90 to 95% by weight of an alkoxyalkyl acrylate, and from 5 to 10% by weight of a carboxylic acid vinyl ester.

13. A rubber composition as in claim 6, wherein said carboxylic acid vinyl ester is vinyl acetate.

14. A rubber composition as in claim 7, wherein said carboxylic acid vinyl ester is vinyl acetate.

15. A rubber composition as in claim 10, wherein said carboxylic acid vinyl ester is vinyl acetate.

16. A rubber composition as in claim 12, wherein said carboxylic acid vinyl ester is vinyl acetate.

17. A rubber composition as n claim 1, wherein said polyethylene has crystallinity to an extent that it is not to be soluble in toluene at 40° C.

18. A rubber composition as in claim 1, wherein said polyethylene has a specific gravity of 0.89 or more.

19. A rubber composition as in claim 18, wherein said polyethylene is selected from medium-density polyethylene, low-density polyethylene, and linear low-density polyethylene.

20. A rubber composition as in claim 1, wherein said crosslinked blend further contains from 1 to 10 parts by weight of a peroxide, from 0.1 to 3 parts by weight of a radical scavenger, and from 0.1 to 5 parts by weight of a thiourea derivative per 100 parts by weight of the mixture of acrylic elastomer and polyethylene.

21. A rubber composition as in claim 20, wherein said radical scavenger is phenothiazine.

22. A rubber composition as in claim 20, wherein said thiourea derivative is trimethylthiourea.

23. A rubber composition as in claim 1, wherein said crosslinked blend further contains a plasticizer in an amount less than twice the weight of the polyethylene, said plasticizer being selected from butyl rubber, and polybutene having a molecular weight of less than 100,000.

24. A rubber composition as in claim 2, wherein said acrylic elastomer further contains a crosslinkable component as a comonomer in an amount of not more than 5% by weight.

25. A rubber composition as in claim 24, wherein said crosslinkable component is glycidyl methacrylate, allyl glycidyl ether, or the mixture thereof.

26. A rubber composition as in claim 24, wherein said crosslinked blend further contains an amine compound in an amount not more than 5 parts by weight per 100 parts by weight of the mixture of acrylic elastomer and polyethylene.

27. A hose prepared from the crosslinked blend of claim 1.

28. A diaphragm prepared from the crosslinked blend of claim 1.

29. A rubber composition as in claim 1, wherein said carbon black is contained in an amount of from 40 to 65 parts by weight per 100 parts by weight of the total amount of acrylic elastomer and polyethylene.

* * * * *